US006551003B1

United States Patent
De La Fuente-Farias

(10) Patent No.: US 6,551,003 B1
(45) Date of Patent: Apr. 22, 2003

(54) JOINT FOR PIVOTALLY JOINING A BRAKE HEAD TO A BRAKE BEAM

(75) Inventor: Jorge De La Fuente-Farias, Monterrey (MX)

(73) Assignee: Acertek S.A. de C.V., Nuevo Leon (MX)

( * ) Notice: Subject to any disclaimer, the term of this patent is extended or adjusted under 35 U.S.C. 154(b) by 0 days.

(21) Appl. No.: 09/668,483

(22) Filed: Sep. 25, 2000

(51) Int. Cl.⁷ ............................. F16B 9/00; B61H 13/36
(52) U.S. Cl. ..................... 403/65; 403/68; 188/219.1; 188/220.1
(58) Field of Search ................... 188/219.1, 220.1; 403/65, 68

(56) References Cited

U.S. PATENT DOCUMENTS

| | | | | |
|---|---|---|---|---|
| 448,720 A | * | 3/1891 | Jewel ..................... | 188/220.1 |
| 690,824 A | * | 1/1902 | Baker ..................... | 188/223.1 |
| 1,092,814 A | * | 4/1914 | Kellogg ................ | 188/219.1 X |
| 3,024,872 A | * | 3/1962 | Uphues et al. ......... | 188/59 |
| 3,307,659 A | * | 3/1967 | Goods .................... | 188/59 |
| 3,314,505 A | * | 4/1967 | Pelikan .................. | 188/59 |
| 3,337,006 A | * | 8/1967 | Pelikan .................. | 188/59 |
| 5,058,712 A | * | 10/1991 | Noah ..................... | 188/59 |
| 6,234,283 B1 | * | 5/2001 | Montes-Ramos ....... | 188/219.1 |
| 6,264,288 B1 | * | 7/2001 | Dreese ................... | 303/15 |

* cited by examiner

Primary Examiner—Lynne H. Browne
Assistant Examiner—Ernesto Garcia
(74) Attorney, Agent, or Firm—Abelman, Frayne & Schwab

(57) ABSTRACT

A joint for pivotally joining a brake head to a brake beam of a railway car which allows to the brake head to modify its radial direction with respect to a bogie wheel, allowing the brake shoe to adapt to the wheel contour, and achieving an adequate force distribution along the brake shoe.

4 Claims, 6 Drawing Sheets

JOINT FOR PIVOTALLY JOINING A BRAKE HEAD TO A BRAKE BEAM

BACKGROUND OF THE INVENTION

1. Field of the Invention

This invention relates to brake head assemblies for using in brake beams of railway cars, and more particularly to a joint for pivotally joining a brake head to a brake beam of a railway car by which it is achieved an adequate force transference along the brake shoe and an adequate contact between the brake shoes and the railway car bogie wheels.

2. Description of the Related Art

Most railroad freight cars, use a mechanism called brake rigging. On the car body, there is an air brake system which provides air to the brake cylinder, which in turn, supplies a mechanical force through a system of rods and driving levers to a connection on the standard freight car trucks located at each end of the car. At this point, the force is applied to a truck driving lever system, usually consisting of two driving levers and a connecting rod. The driving levers move brake beams, which apply force to the treads of the wheels through renewable friction blocks or brake shoes, retarding the rotation of the wheels.

The conventional brake rigging includes two brake beams, at least one brake cylinder assembly and a driving lever or linkage assembly so connected between the brake beams and cylinder assembly that actuation of the cylinder assembly moves the brake beams away from one another and into braking engagement with treads of wheels of a railway vehicle truck.

There are many brake beam configurations which may be used with the above referred general type of brake rigging, but the most commonly used brake beam configuration comprises: a compression member, a generally "V" shaped tension member having its ends coupled to the ends of the compression member, a brake head linked to the each end of the compression and/or tension members, each comprising a brake shoe carrier having a brake shoe, two end extensions, each linked at each end of the tension and/or compression member, or hanging means, by which the brake beam is coupled to the bogie of a railway car, and a fulcrum assembled to the compression member and tension member, so that the fulcrum remains between the tension and compression members.

Normally, the brake heads are fixedly linked to the brake beam by means of bolts passing through perforations located at the ends of the brake beam and through perforations located at the brake heads. Also, the brake heads may be linked to a brake beam by welding the brake shoe carriers directly to the ends of the brake beam.

The looseness between the extensions of the brake beam and its guides—which is necessary in order to compensate for the movements of the truck components when it's in operation—, causes the brake beam to hang from the truck, so that its position does not point to the center of the wheel. Furthermore, during the braking operation, due to existent rigid joints between the extensions of the brake beam and its truck guides, between the brake heads and the wheels during the braking operation and between the brake head and the brake beam, the forces applied to the brake head are not transmitted in an uniform way along the brake shoe, thus producing a non-uniform and incomplete wear of the useful material of the brake shoes, which is a waste of useful material that could be properly used, and therefore, the maintenance team is forced to frequently change the brake shoe material which is a waste of time and money.

In extreme cases, the material of the brake shoe is so worn at some points, that the metal of the brake shoe carrier comes in direct contact with the correspondent bogie wheel, damaging the brake shoe carrier as well as the wheel.

Considering the above referred problems, applicants developed a joint for pivotally joining a brake head to a brake beam which pivotally joints the brake head to the brake beam in order to allow the brake head to modify its radial direction with respect to the wheel, thus allowing the brake shoe to adapt to the wheel contour and achieving an adequate force distribution along the brake shoe.

Applicants joint for pivotally joining a brake head to a brake beam comprises: brake beam linking means, fixedly linked to a brake beam or linked with a controlled degree of rotational freedom to a brake beam, and including pivoting retaining means for pivotally retain a brake head, and brake head pivotal linking means located at the brake head for pivotally retain the brake head to the pivoting retaining means of the brake beam linking means.

With applicants pivotal joint, all the useful material of the brake shoe is totally used, thus avoiding frequent changes of the brake shoe material, which help to achieve great money saves in view of the high maintenance costs caused by the frequent changes, and avoid the waste of useful brake shoe material that still could be used if the thickness of the remaining material were uniform.

SUMMARY OF THE INVENTION

It is therefore a main object of the present invention, to provide a joint for pivotally joining a brake head to a brake beam.

It is also a main object of the present invention to provide a joint for pivotally joining a brake head to a brake beam, which allows the brake head to modify its radial direction with respect to the beam by self-adjusting with respect to the wheel.

It is also a main object of the present invention to provide a joint for pivotally joining a brake head to a brake beam, by which it is achieved an uniform force distribution along the brake shoe, thus allowing the brake shoe material of the brake head to adapt to the wheel contour as the material of the brake shoe is worn.

It is still another object of the present invention to provide a joint for pivotally joining a brake head to a brake beam, by which all the useful material of the brake shoe is totally used, thus avoiding frequent changes of the brake shoe material.

It is still another object of the present invention to provide a joint for pivotally joining a brake head to a brake beam, by which it is achieved an uniform and complete wear of all the brake shoe material.

These and other objects and advantages of the joint for pivotally joining a brake head to a brake beam of the present invention will become apparent to those persons having an ordinary skill in the art, from the following detailed description of the embodiments of the invention, which will be made with reference to the accompanying drawings.

DETAILED DESCRIPTION OF THE INVENTION

Figure 1:
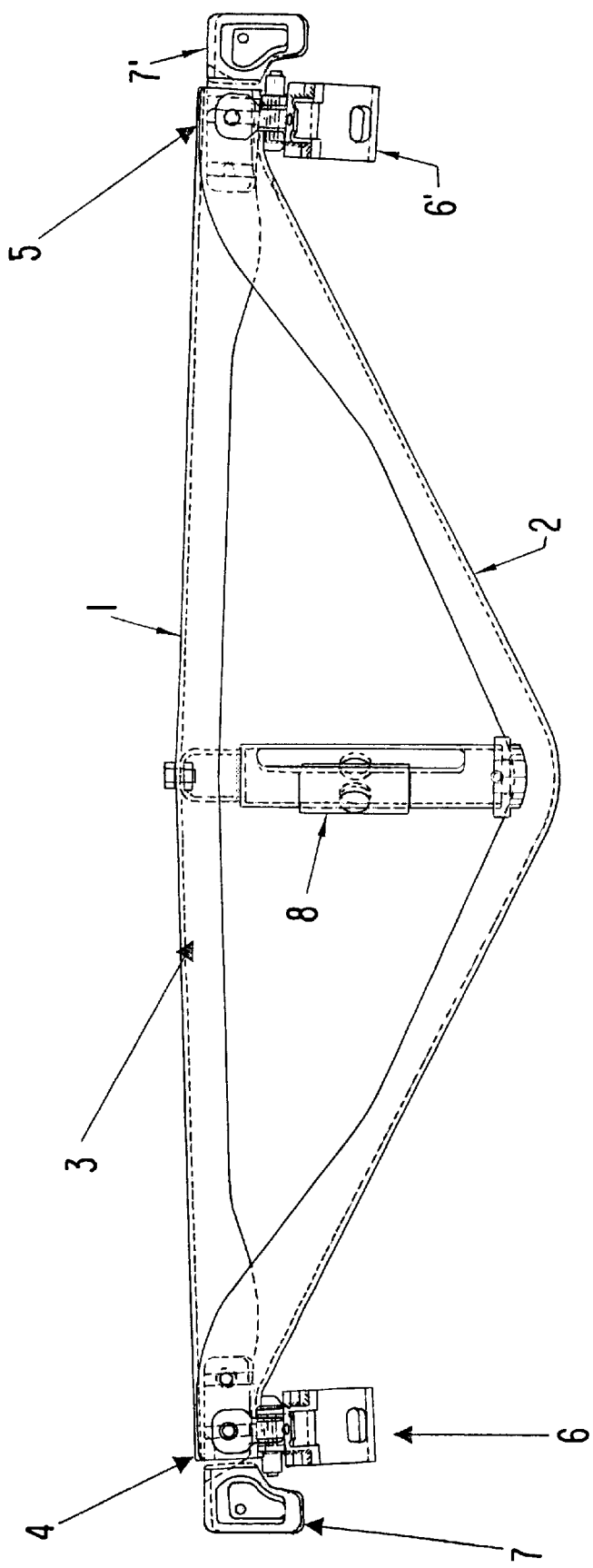
FIG. 1 is a front view of a brake beam including the pivotal joint of the present invention in accordance with a first embodiment thereof.
Figure 2:
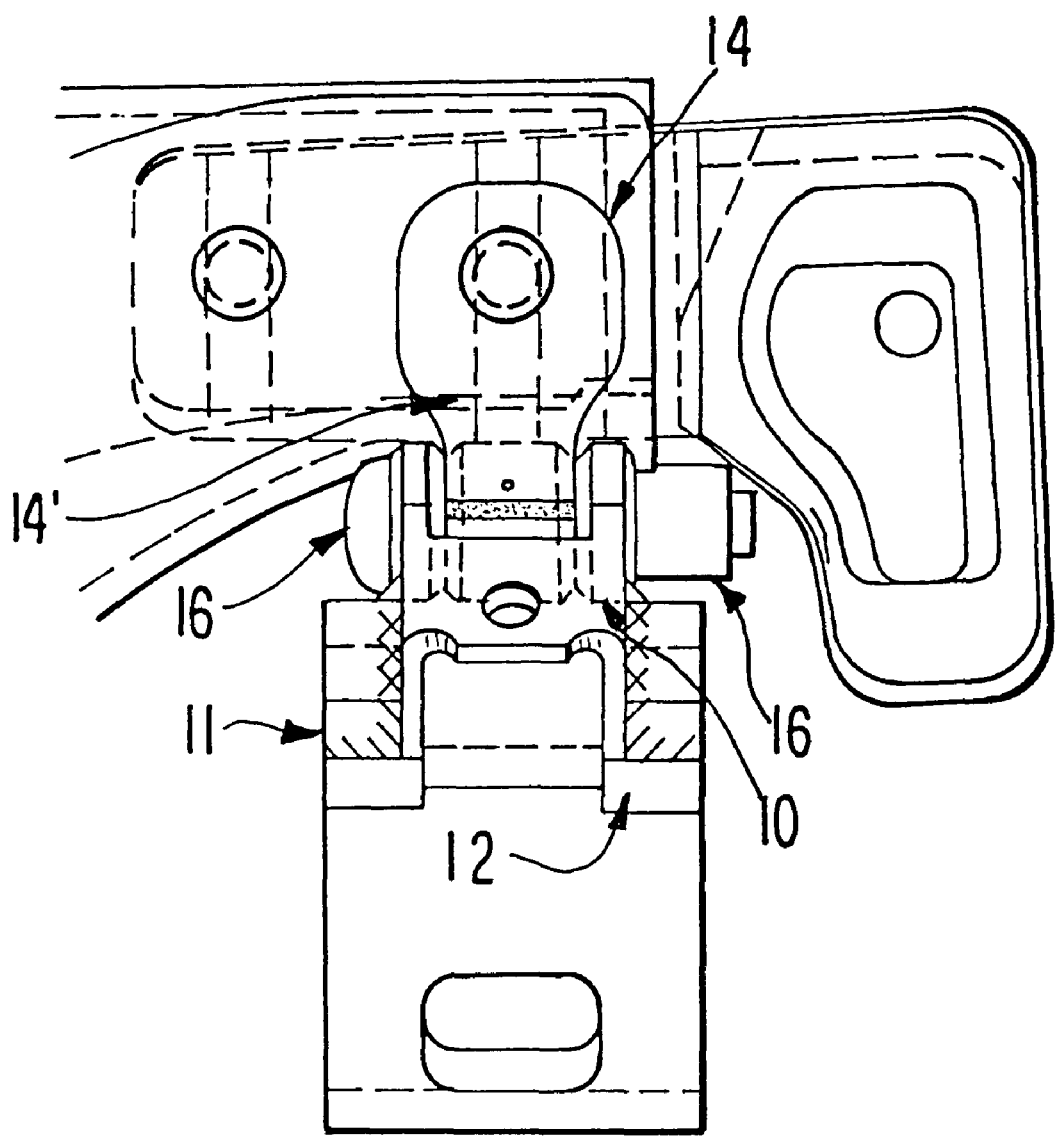
FIG. 2 is a front view of an end of a brake beam including the pivotal joint of the present invention in accordance with a first embodiment thereof.
Figure 3:
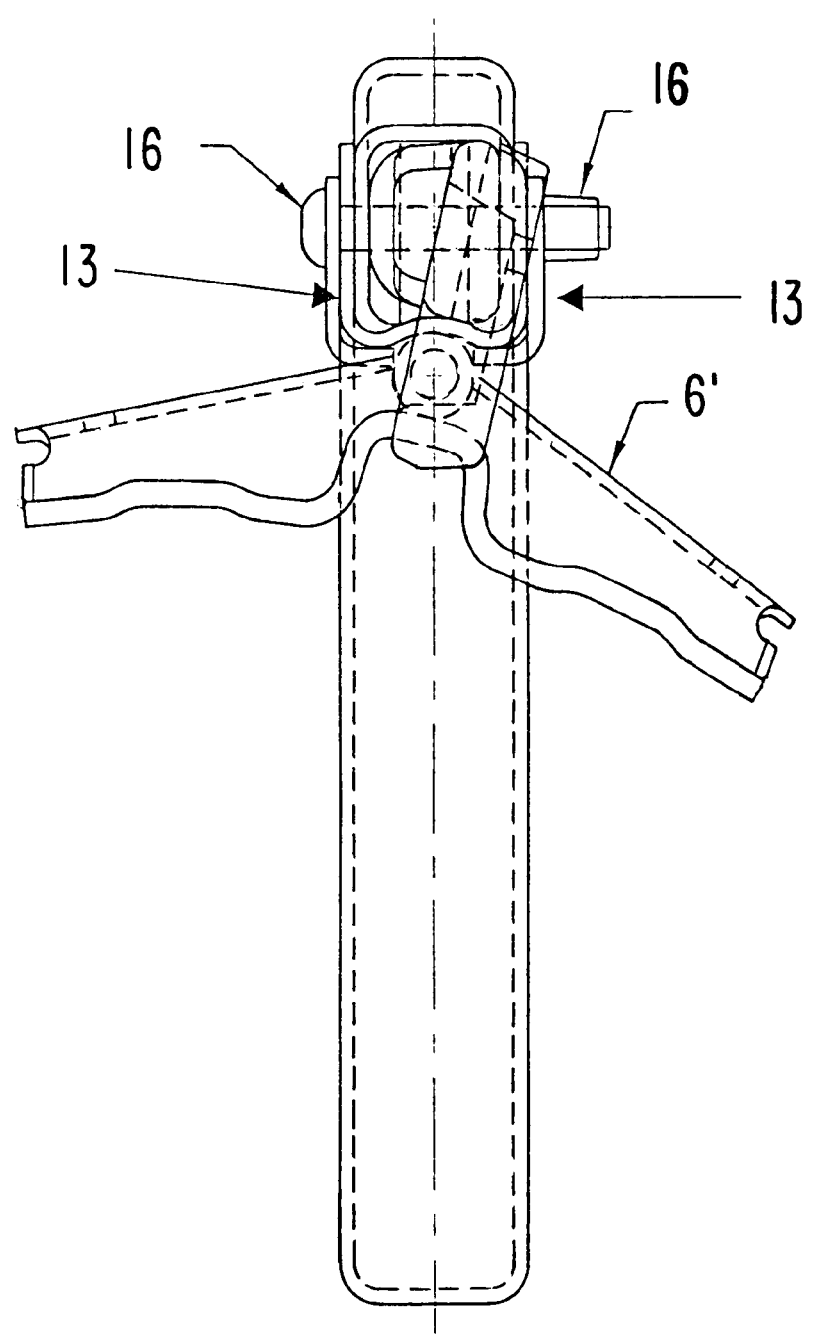
FIG. 3 is a lateral view of an end of a brake beam including the pivotal joint of the present invention in accordance with a first embodiment thereof.
Figure 4:
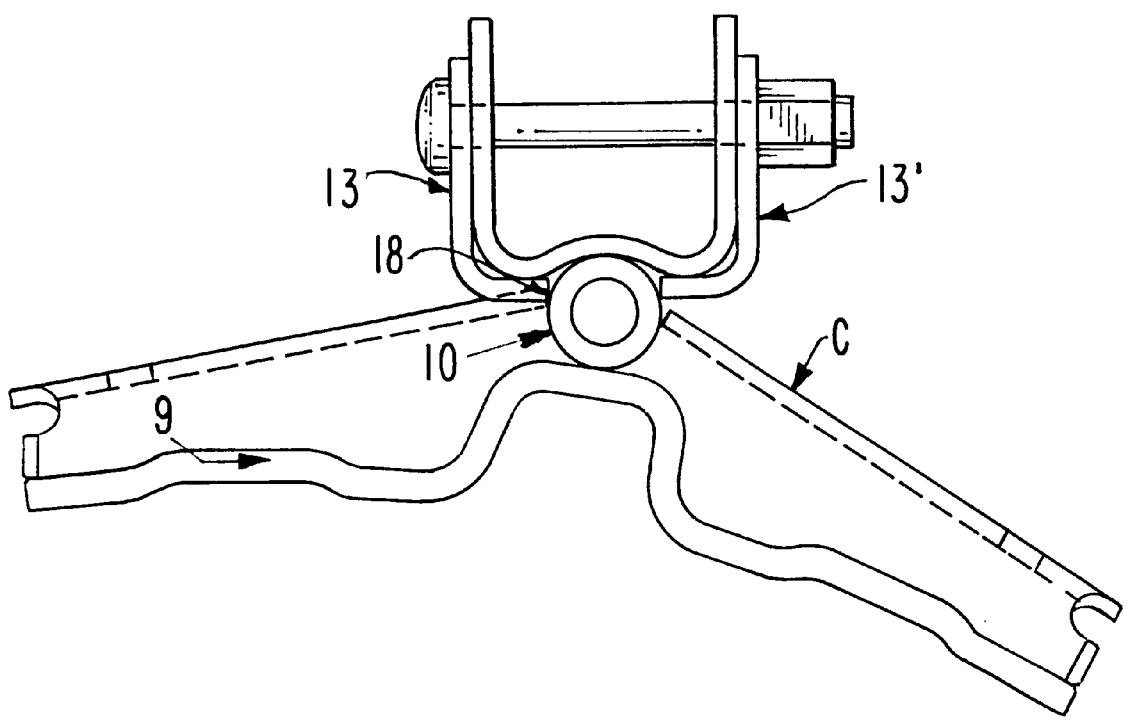
FIG. 4 is a view of the cross section of a brake beam end including the pivotal joint of the present invention in accordance with a first embodiment thereof.
Figure 5:
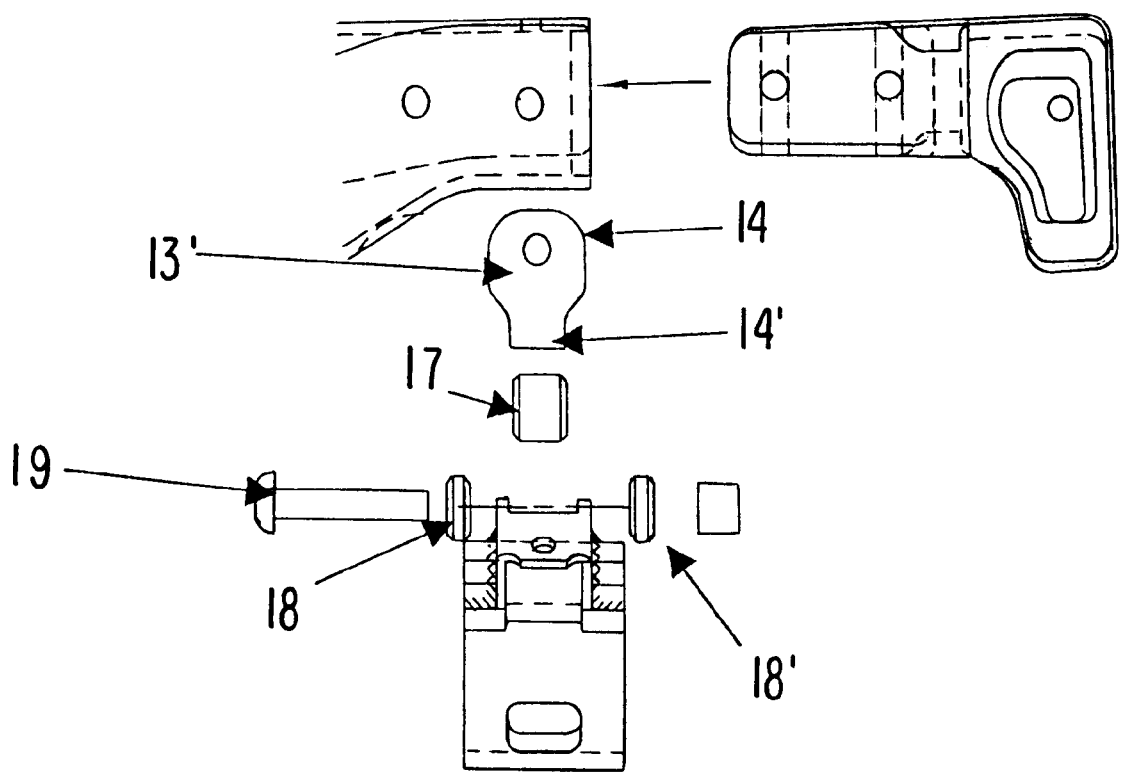
FIG. 5 is an exploded front view of the pivotal joint of the present invention in accordance with a first embodiment thereof.
Figure 6:
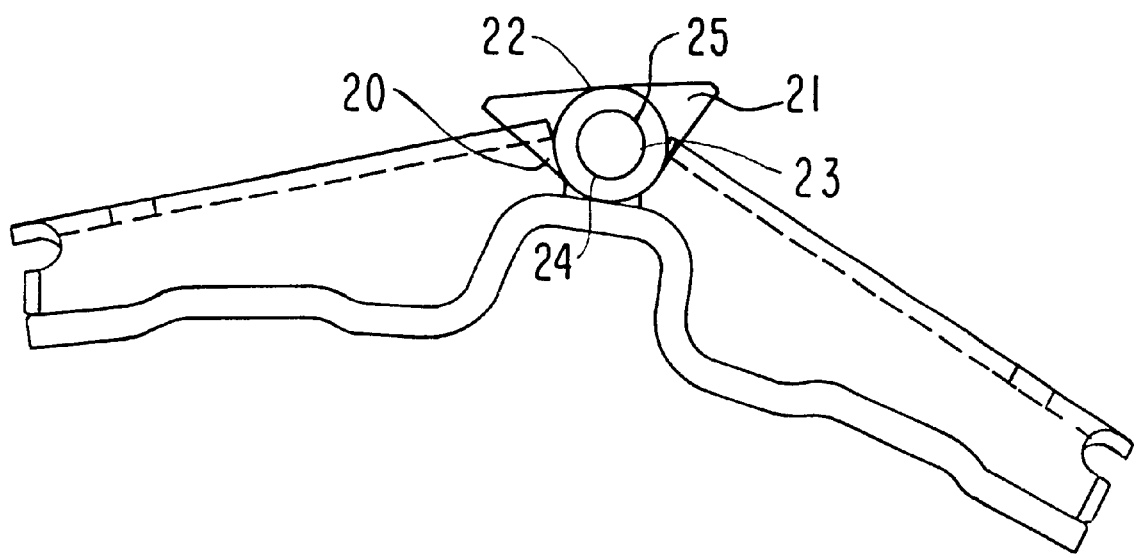
FIG. 6 is a lateral view of a brake shoe carrier including the pivotal joint of the present invention in accordance with a second embodiment thereof.

A typical brake beam comprises: a compression member 1, a generally "V" shaped tension member 2 having its ends coupled to the ends of the compression member 1, each including a first 3 and a second (not shown) longitudinal side and a first 4 and a second 5 end, a brake head 6,6' linked to each end of the compression 1 and/or tension member 2, two end extensions 7,7' or hanging means by which the brake beam is coupled to the bogie of a railway car (not shown) and a fulcrum 8 assembled or welded to the compression member 1 and a tension member 2.

A typical brake head comprises: a brake shoe carrier "C" having a brake shoe receiving section 9 and a coupling section 10 opposite to the brake shoe receiving section 9 by which the brake head is coupled to the brake beam, the brake shoe receiving section 9 having a first 11 and a second 12 transversal ends and a transversal axis (not shown), The joint for pivotally joining a brake head to a brake beam of the present invention, will now be described in accordance with its most general embodiment thereof, comprising:

brake beam linking means for linking a brake head to the brake beam, including a first and a second end, the linking means fixedly linked at the first end to a brake beam or linked at the first end with a controlled degree of rotational freedom by means of a bolt passing through a bore located at the brake beam and including pivoting retaining means for pivotally retain a brake head at its second end;

brake head pivotal linking means for pivotally linking the brake head to the pivoting retaining means of the brake beam linking means.

Now, the joint for pivotally joining a brake head to a brake beam will be described in accordance with a preferred embodiment thereof illustrated in the accompanying drawings wherein the same signs and numbers, refer to the same parts of the shown figures and referring to a typical brake beam and brake head, wherein the joint for pivotally joining a brake head to a brake beam comprising, for each brake head:

brake beam linking means comprising:
two metal plaques 13, 13', each comprising a flat rectangular shaped piece having a first 14 and a second 14' longitudinal ends, and including a perforation 15 at the first longitudinal end 14. Each plaque 13,13' linked to an end of the tension member at a longitudinal side thereof by means of a bolt 16 passing through the perforations 15 of the metal plaques and through perforations at the tension member (not shown);
a plaque bushing 17 having a diametric axis (not shown), welded to the second longitudinal end 14' of each metal plaque and retained between both plaques 13,13', the diametric axis remaining perpendicular to both longitudinal sides 3, of the tension member.

Brake head pivotal linking means for a brake head comprising:
two brake head bushings 18,18' having a diametric axis (not shown), each bushing 18,18' welded at each transversal end 11,12 of the coupling section 10 of the brake shoe carrier C facing each other and separated among them, the diametric axis of each brake head bushing 18,18' remaining perpendicular to the transversal axis of the brake shoe carrier coupling section 10.

The plaque bushing 17 is received between both brake head bushings 18,18', and a bolt 19 passes through the plaque bushing 17 and both brake head bushings 18,18', thus pivotally linking the brake head to the metal plaques 13,13'.

Although it was disclosed that the brake beam linking means comprise two metal plaques 13,13' and a bushing 17, they may be comprised by any kind of linking means for pivotally linking a brake head, such as a clasp having a pivoting rod.

In the same way, although it was disclosed that the brake head pivotal linking means comprise a pair of bushings 18,18', they may be comprised by a perforation and bearing located at the coupling section.

In a second embodiment of the present invention, the joint for pivotally joining a brake head to a brake beam comprises for each brake head:

brake beam linking means comprising:
two flat triangular shaped metal pieces 20, each having a first 21 and a second surface (not shown), and a base portion 22, and each including a perforation 23 at a central portion thereof. The base portion 22 of each flat triangular metal piece 20,20' is linked to the tension member 2, remaining perpendicular to the longitudinal sides thereof and each flat triangular metal piece 20,20' facing each other;
two plaque bushing elements 24, each having a diametric axis (not shown) and welded to the first surface 21 of a flat triangular shaped metal piece, so that each plaque bushing element 24,24' remain facing each other, and the diametric axis of each bushing element 24, remaining perpendicular to both longitudinal sides of the tension member 2;

Brake head pivotal linking means for a brake head comprising:
One brake head bushing 25 having a diametric axis (not shown), welded at a central portion of the brake shoe carrier coupling section 10, between the first and second transversal ends 11,12, and retained between the two plaque bushing elements 24,24' by means of a bolt (not shown) passing through the plaque bushings 24,24' and brake head bushing 25 and through the perforation 23 of the flat triangular shaped metal piece 20, thus pivotally linking the brake head to the brake beam.

The joint for pivotally joining a brake head to a brake beam of the present invention allows to the brake head to modify its radial direction with respect to the beam, by self aligning in respect to the wheel as the brake shoe material is worn, by which it is achieved an adequate force distribution along the brake shoe and an adequate contact of all the brake shoe material with the wheel when the brakes are applied, during all the useful life of the brake shoe material. Thus, all the material of the brake shoe is used, avoiding frequent brake shoe changes, and frequent brake beam heads damage.

Finally it must be understood that the joint for pivotally joining a brake head to a brake beam of the present invention, is not limited exclusively to the above described and illustrated embodiments and that the persons having ordinary skill in the art can, with the teaching provided by this invention, to make modifications to the design and component distribution of the joint for pivotally joining a brake head to a brake beam of the present invention, which will clearly be within the true inventive concept and scope of the invention which is claimed in the following claims:

What is claimed is:

1. A joint for pivotally joining a brake head having two transverse ends and a transverse axis, to a railway brake beam having first and second longitudinal sides, said joint comprising:
   brake beam linking means for linking the brake head to the brake beam and joined to the brake beam, and including brake head pivotal linking means for pivotally linking the brake head to the brake beam, said brake beam linking means comprising:
   two metal plaques, each comprising a flat rectangular-shaped piece having first and second longitudinal ends, each plaque joined by the first longitudinal end to an end of the brake beam; and
   a plaque bushing having a diametric axis, retained between both metal plaques and welded to the second longitudinal end of both metal plaques, wherein the diametric axis remains perpendicular to both longitudinal sides of the brake beam.

2. The joint according to claim 1, wherein the first longitudinal side of each metal plaque has a perforation, and is linked to the brake beam by means of a bolt passing through the perforation and through a perforation located at an end of the brake beam.

3. The joint according to claim 1, wherein the brake head pivotal linking means comprises:
   two brake head bushings each having a diametric axis linked to a transverse end of the brake head and the diametric axis remaining perpendicular to the transverse axis of the brake head, each bushing facing and separated from each other, and the plaque bushing being received between both brake head bushings; and
   a bolt, passing through the plaque bushing and both brake head bushings, thus pivotally linking the brake head to the metal plaques.

4. The joint according to claim 1, wherein the first longitudinal side of each metal plaque is welded to an end of the brake beam.

* * * * *